US007478476B2

(12) United States Patent
Kawamura

(10) Patent No.: US 7,478,476 B2
(45) Date of Patent: Jan. 20, 2009

(54) METHODS OF FABRICATING FIT FIRING CHAMBERS OF DIFFERENT DROP WIGHTS ON A SINGLE PRINTHEAD

(75) Inventor: Naoto Kawamura, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 11/226,131

(22) Filed: Sep. 14, 2005

(65) Prior Publication Data

US 2006/0007270 A1 Jan. 12, 2006

Related U.S. Application Data

(62) Division of application No. 10/317,767, filed on Dec. 10, 2002, now Pat. No. 6,966,112.

(51) Int. Cl.
*B21D 53/76* (2006.01)
*G01D 15/00* (2006.01)

(52) U.S. Cl. .......................... 29/890.1; 29/611; 216/27

(58) Field of Classification Search ................ 29/890.1, 29/611, 612, 610.1; 347/65, 56, 62, 66, 63; 216/27, 79

See application file for complete search history.

(56) References Cited

U.S. PATENT DOCUMENTS 4,604,654 A 8/1986 Sakurada et al.
4,716,423 A * 12/1987 Chan et al. .................... 347/65
RE32,572 E 1/1988 Hawkins et al.
4,746,935 A 5/1988 Allen
4,774,530 A 9/1988 Hawkins
5,229,785 A 7/1993 Leban
5,322,594 A 6/1994 Bol
5,412,410 A * 5/1995 Rezanka ...................... 347/15
5,658,471 A * 8/1997 Murthy et al. ................ 216/27
5,665,249 A * 9/1997 Burke et al. ................... 216/2
5,745,131 A 4/1998 Kneezel et al.
5,774,148 A 6/1998 Cornell et al.
5,793,393 A * 8/1998 Coven ......................... 347/65
5,883,650 A 3/1999 Figueredo et al.
6,000,787 A * 12/1999 Weber et al. .................. 347/65
6,146,915 A * 11/2000 Pidwerbecki et al. ......... 438/21

OTHER PUBLICATIONS

R.A. Askeland, et al., "The Second-Generation Thermal Inkjet Structure", Hewlett-Packard Journal, Aug. 1988, pp. 28-31.
W.A. Buskirk et al, "Development of a High-Resolution Thermal Inkjet Printhead", Hewlett-Packard Journal, Oct. 1988, pp. 55-61.
J.S. Aden et al, "The Third-Generation HP Thermal Inkjet Printhead", Hewlett Packard Journal, Feb. 1994, pp. 41-45.

* cited by examiner

*Primary Examiner*—Peter Vo
*Assistant Examiner*—Tai Nguyen

(57) ABSTRACT

Inkjet printheads capable of printing smaller and larger drop-weight quantities of ink, and methods of manufacturing the inkjet printheads, are disclosed. The inkjet printhead includes a substrate. One or more portions of the substrate may be etched such that the substrate might have different thicknesses. In one example embodiment, an orifice layer can by applied to the substrate that has orifice areas with different orifice thicknesses.

10 Claims, 7 Drawing Sheets

METHODS OF FABRICATING FIT FIRING CHAMBERS OF DIFFERENT DROP WIGHTS ON A SINGLE PRINTHEAD

CROSS REFERENCE TO RELATED APPLICATIONS

This is a divisional of application Ser. No. 10/317,767 filed on Dec. 10, 2002 now U.S. Pat. No. 6,966,112, which is hereby incorporated by reference herein.

FIELD OF THE INVENTION

This invention relates to inkjet printers. In particular, this invention relates to novel designs and methods of manufacture of an inkjet printhead capable of printing varying drop-weight quantities of ink.

BACKGROUND OF THE INVENTION

Inkjet printing mechanisms employ pens having printheads that reciprocate over a media sheet and expel droplets onto the sheet to generate a printed image or pattern. Such mechanisms may be used in a wide variety of applications, including computer printers, plotters, copiers, and facsimile machines. For convenience, the concepts of the invention are discussed in the context of a printer.

A typical printhead includes a silicon-chip substrate having a central-ink aperture that communicates with an ink-filled chamber of the pen when the rear of the substrate is mounted against the cartridge. An array of firing resistors is positioned on the front of the substrate, within a chamber enclosed peripherally by a thin-film layer surrounding the resistors and the ink aperture. An orifice layer connected to the thin-film just above the front surface of the substrate encloses the chamber, and defines a firing chamber just above each resistor. Additional description of basic printhead structure may be found in "The Second-Generation thermal Inkjet Structure" by Ronald Askeland et al. in the Hewlett-Packard Journal, August 1988, pages 28-31; "Development of a High-Resolution Thermal Inkjet Printhead" by William A. Buskirk et al. in the Hewlett-Packard Journal, October 1988, pages 55-61; and "The Third-Generation HP Thermal Inkjet Printhead" by J. Stephen Aden et al. in the Hewlett-Packard Journal, February 1994, pages 41-45.

In order to minimize the number of required printheads for a complete printing system and to obviate the need to align separate printheads in a printing system, it is desirable to have the ability to include firing chambers of different drop weights, for example a color column and a black column, on a single printhead. In the past, manufacturers have been unable to make printheads with firing chambers of different drop weights, because firing chambers of different drop weights traditionally required different orifice-layer thicknesses in order to produce the best ink trajectory and drop shape with optimum energy efficiency.

Accordingly, it is an object of the present invention to provide designs for and methods of manufacturing inkjet printheads with firing chambers capable of printing varying drop-weight quantities of ink with optimal energy efficiency and dot shape.

SUMMARY OF THE INVENTION

The present invention can be broadly summarized as follows. A substrate has a first-substrate portion with a first-substrate thickness that is thicker than a second-substrate thickness corresponding to a second-substrate portion. A thin-film layer defines a plurality of ink-supply conduits and has a plurality of independently addressable ink-energizing elements. At least one of the ink-energizing elements is aligned with the first-substrate portion and at least one of said plurality of ink-energizing elements is aligned with the second-substrate portion. An orifice layer has a lower-orifice-layer surface conformally coupled to the thin-film layer and an exterior-orifice-layer surface of a uniform height such that the orifice layer has first-orifice portion with a first-orifice thickness that is thicker than a second-orifice thickness corresponding to a second-orifice portion. The orifice layer defines a plurality of firing chambers. Each firing chamber opens through a respective nozzle aperture in the exterior-orifice-layer surface and extends through the orifice layer to expose a respective said ink-energizing element. Each firing chamber is in fluid communication with its respective said ink-supply conduits. At least some of the firing chambers are laterally separated from all other firing chambers by a portion of the orifice layer, such that the firing chambers are not laterally interconnected. By using this configuration, each firing chamber located in the first-orifice portion of the orifice layer that has a first-orifice thickness produces a different-sized drop-weight quantity of ink when its respective said ink-energizing element is energized than each firing chamber located in the second-orifice portion of the orifice layer that has a second-orifice thickness produces when its respective said ink-energizing element is energized.

The inkjet printhead of the embodiment of the previous paragraph can be manufactured by performing the following steps. A provided substrate is etched in order to define at least two substrate areas with different substrate thicknesses. A thin-film layer containing at least one-ink-energizing element is applied to the substrate. At least one of the elements is located in each of the substrate areas. A plurality of ink-supplying conduits is etched in the thin-film layer. At least one ink-supplying trench is etched in the substrate in order to provide fluid communication with at least some of the ink-supplying conduits. An orifice layer is applied to the substrate. The orifice layer has an exterior-orifice-layer surface that is substantially planar such that there are at least two orifice areas with different orifice thicknesses that correspond to the two-substrate areas with different substrate thicknesses. At least one firing chamber is formed in each of the two orifice areas in order to provide firing chambers with the capability of producing varying drop-weights quantities of ink.

In another embodiment, the orifice layer has a substantially uniform thickness. However, the orifice layer defines at least two different-sized firing chambers, each having different volumes. Preferably, the larger-volume firing chamber will have a more powerful ink-energizing element that is laterally offset from the firing chamber's nozzle aperture. And, the smaller-volume firing chamber will have a less powerful ink-energizing element that is aligned with the firing chamber's nozzle aperture. Thus, in this embodiment, the larger-volume firing chamber produces a larger (i.e. heavier) drop-weight quantity of ink, and the smaller-volume firing chamber produces a smaller (i.e. lighter) drop-weight quantity of ink.

Of course, the printheads, print cartridges, and methods of these embodiments may also include other additional components and/or steps.

Other embodiments are disclosed and claimed herein as well.

BRIEF DESCRIPTION OF THE DRAWINGS

The present invention may take physical form in certain parts and steps, embodiments of which will be described in detail in this specification and illustrated in the accompanying drawings which form a part hereof, wherein.

DETAILED DESCRIPTION OF THE INVENTION

The present invention provides novel designs and methods of manufacture of an inkjet printhead capable of printing varying drop-weight quantities of ink. In particular, this invention overcomes the problems of the prior art by preferably etching a substrate in order to provide firing chambers with different orifice-layer thicknesses. This provides variable distances between ink-energizing elements in firing chambers and their corresponding orifices. Alternatively, the invention can utilize firing chambers with different volumes, different-sized ink-energizing elements, and/or laterally offset ink-energizing elements. Thus, by varying the distance between orifices and their ink-energizing elements, providing firing chambers with different volumes, providing different-sized ink-energizing elements and/or laterally offsetting ink-energizing elements from their corresponding orifices, a manufacturer can provide inkjet printheads capable of printing varying drop-weight quantities of ink.

Figure 1:
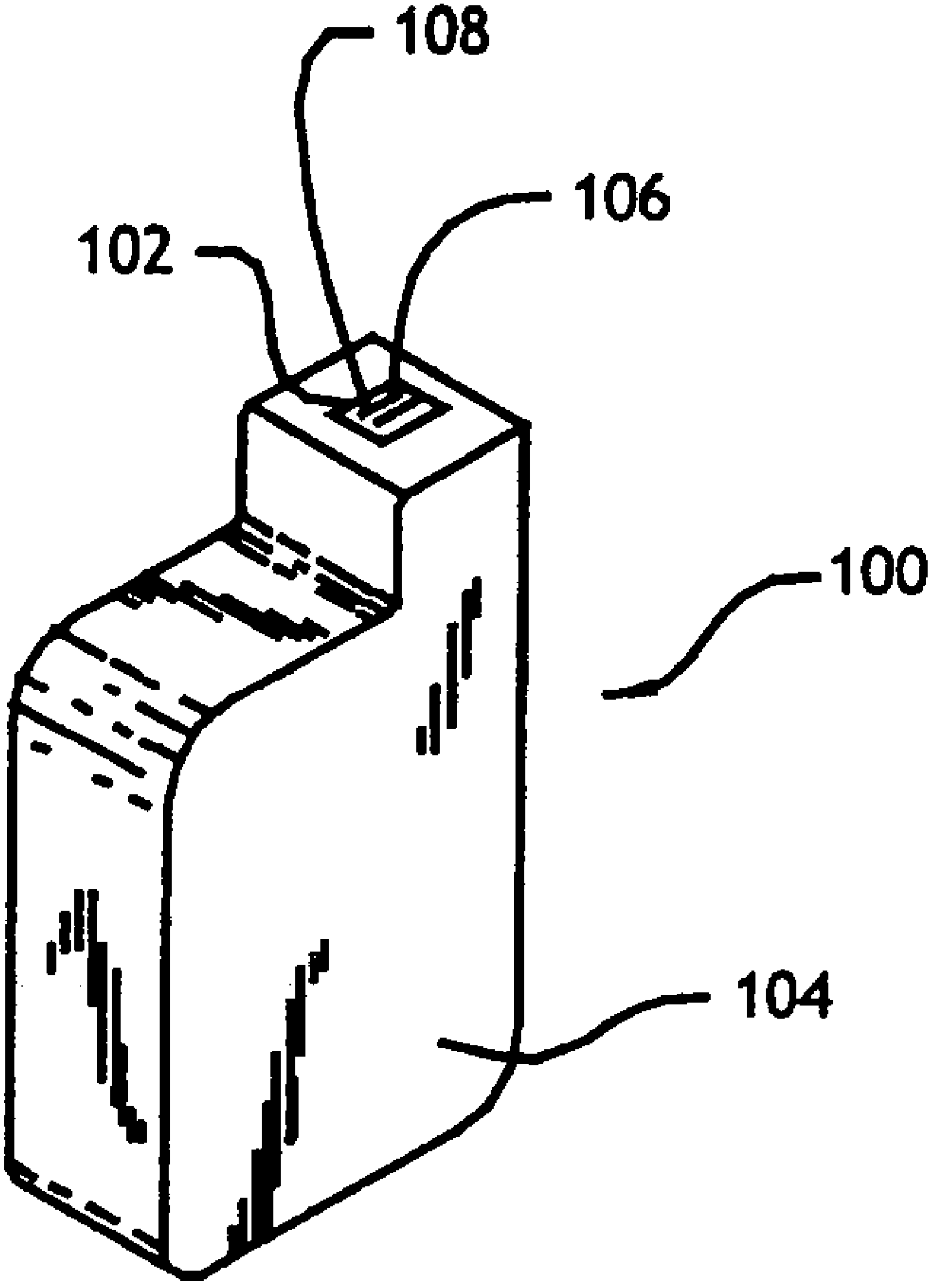
FIG. 1 is a perspective view of an inkjet print cartridge having a printhead in accordance with the present invention.

FIG. 1 shows a thermal inkjet pen 100 having a printhead 102 according to a preferred embodiment of the invention. The pen includes a lower portion 104 containing an ink reservoir that communicates with the back or lower side of the printhead in the orientation shown. The printhead preferably defines one or more orifices or nozzles 106, 108 through which ink may be selectively expelled.

Figure 2:
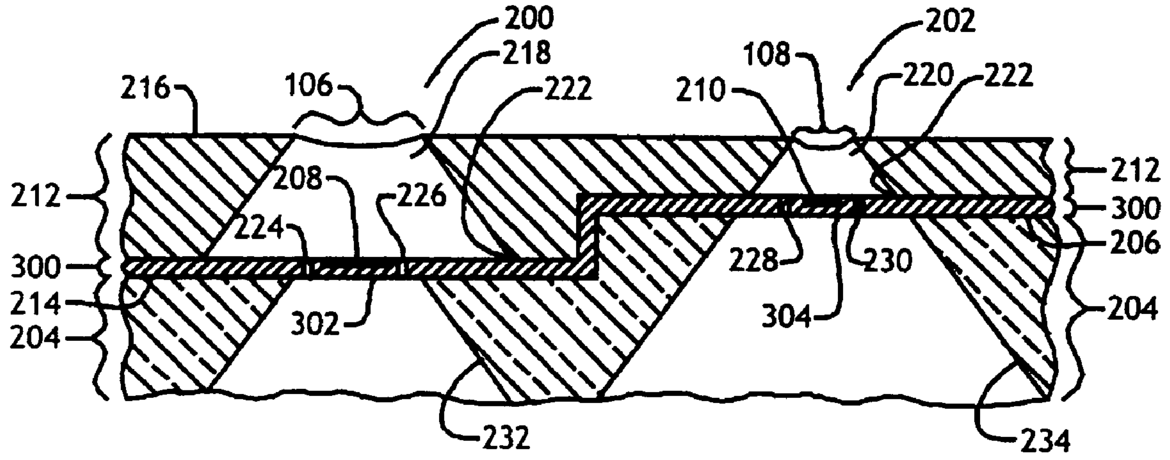
FIG. 2 is an enlarged sectional side view of one embodiment of the printhead of the present invention; wherein the orifice layer has different thicknesses.

FIG. 2 shows a cross section of the printhead 102 taken through two orifices 106, 108 to illustrate two firing units 200, 202. The printhead includes a substrate 204, preferably silicon, which provides a rigid chassis for the printhead 102, and accounts for the majority of the thickness of the printhead 102. The substrate 204 has an upper surface 206 that is preferably coated with a passivation or thin-film layer 300. Ink-energizing elements 208, 210, such as resistors, rest on the thin-film layer 300 if present. An orifice layer 212 has a lower surface 214 that conformally rests atop either the thin-film layer 300. The orifice layer 212 also has an exterior surface 216 that forms the uppermost surface of the printhead and faces the material on which ink is to be printed. The center point of the resistors 208, 210 preferably define a normal axis on which the components of their respective firing units 200, 202 are aligned in this embodiment.

The orifice layer 212 of this embodiment has a substantially planar exterior surface 216. However, one or more firing chambers 218, 220 will have an orifice layer 212 with different thicknesses. There is essentially no limit to the number of different orifice-layer thicknesses that can be used to form firing chambers and thus provide varying drop-weight printing capabilities.

An example of firing chambers 218, 220 with different orifice-layer thicknesses is shown in FIG. 2. In particular, firing chamber 218 has an orifice layer 212 that is thicker than the orifice layer of firing chamber 220. Consequently, the resistor 210 is located in closer proximity to orifice 108 than the resistor 208 is located to its orifice 106.

Preferably, resistor 208 is more powerful than resistor 210. Moreover, resistor 208 should be sufficiently more powerful than resistor 210 so that when energized, resistor 208 will produce a higher drop-weight quantity of ink.

The firing chambers 218, 220 defined by the orifice layer 212 are preferably frustoconical in shape and aligned on the resistor axis. However, any shape or configuration could be used to define the firing chambers 218, 220. If a firing chamber is frustoconically shaped, then the firing chamber will have a large circular base periphery 222 at the lower surface 214, and a smaller circular nozzle aperture 106, 108 at the exterior surface 216. The thin-film layer 300 preferably defines one or more ink-supply conduits 224-230 preferably dedicated to a single illustrated firing chamber 218, 220. The conduits 224-230 are preferably entirely encircled by the chamber's lower periphery, so that the ink transmitted by each conduit is exclusively used by its respective firing chamber, and so that any pressure generated within the firing chamber 218, 220 will not generate ink flow to other chamber—except for the limited amount that may flow back through the conduits, below the upper surface of the substrate. This prevents pressure "blow by" or "cross talk" from significantly affecting adjacent firing units, and prevents pressure leakage that might otherwise significantly reduce the expulsive force generated by a given amount of energy provided by a resistor 208, 210. The use of more than a single conduit 224-230 per firing unit 218, 220 is not necessary; however, this is preferable because it provides redundant ink-flow paths to prevent ink starvation of the firing chamber 218, 220 by a single contaminant particle that may obstruct ink flow in a conduit 224-230.

Preferably, the substrate 204 defines a tapered trench 232, 234 for a plurality of firing units 200, 202, that is widest at the lower surface of the substrate 204 to receive ink from the reservoir 104, and which narrows toward the orifice layer 212 to a width greater than the domain of the ink conduits 224-230. However, any shapes or configurations could be used to provide fluid communication between the ink reservoir 104 and the firing chambers 218, 220. In this embodiment, the cross-sectional area of the trench 232, 234 is many times greater than the cross-sectional area of the ink-supply conduits 224-230 associated with a firing chamber, so that a multitude of such units may be supplied without significant flow resistance in the trench. The trench 232, 234 creates a void behind the resistor 208, 210, leaving only a thin septum or sheet of thin-film material 302, 304 (in FIG. 3) that separates the resistors 208, 210 from the ink within the trenches 232, 324.

Figure 3:
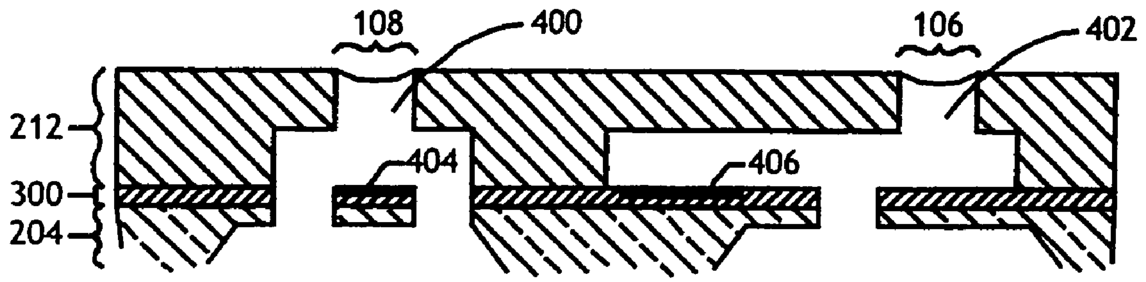
FIG. 3 is an enlarged sectional side view of another embodiment of the printhead of the present invention, wherein the orifice layer has a uniform thickness but at least some firing chambers have different volumes.

As shown in FIG. 3, another embodiment of the present invention also provides the capability of printing varying drop-weight quantities of ink. In this embodiment, the firing chambers 400, 402 are defined in an orifice layer 212 that may or may not have a substantially uniform thickness. Firing chambers 402 that are to produce greater drop-weight quantities of ink preferably have a larger volume than those chambers 400 that are to produce smaller drop-weight quantities of ink. In addition, it is also preferable for the larger-volume chambers 402 to be shaped or configured such that an ink-energizing element can be laterally offset from its corresponding orifice 108.

Firing chambers 402 that are to produce greater drop-weight quantities of ink are preferably provided with ink-energizing elements, such as resistor 406, that generate more energy when energized but that are located further from its orifice 108. Similarly, firing chambers 400 that are to produce smaller drop-weight quantities of ink are preferably provided with ink-energizing elements, such as resistor 404, that generate less energy when energized.

In a variation of the foregoing embodiments, the trench 234 can be laterally offset from alignment with one or more firing chambers 220 (not shown). An example of this can be found in print cartridge number C6578D, which is commercially available from Hewlett-Packard.

In an alternate embodiment, a thin-film layer can define a perforated region corresponding to the widest lower opening of the trench 234. This permits ink to flow into the trench 234 and can also function as a mesh filter to prevent particles from entering the ink conduit system of channels.

Figure 4A:
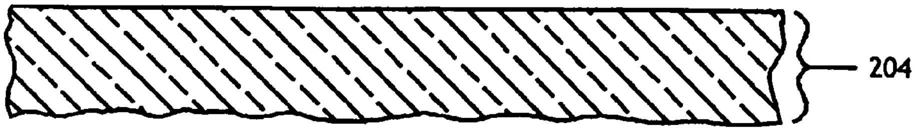
FIGS. 4A-4G illustrate one method of manufacturing a printhead in accordance with the present invention.
Figure 4B:
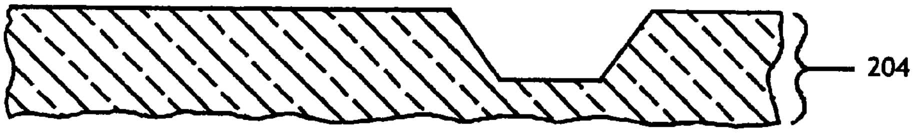
Figure 4C:
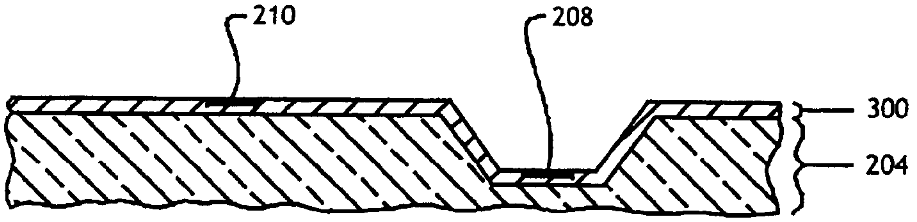

In the foregoing embodiments, the substrate 204 is preferably a silicon wafer about 675 μm thick, although glass or a stable polymer may be substituted. The thin-film layer 300, if present, is formed of silicon dioxide, phosphosilicate glass, tantalum-aluminum (i.e. resistor), silicon nitride, silicon carbide, tantalum, or other functionally equivalent material having different etchant sensitivity than the substrate, with a total thickness of about 3 μm. The conduits 224-230 have a diameter about equal to or somewhat larger than the thickness of the thin-film layer 300. The orifice layer 212 has a thickness of about 10 to 30 μm, the nozzle aperture 106 has a similar diameter, and the lower periphery of the firing chamber has a diameter about double the width of the resistor 208, which is a square 10 to 30 μm on a side. However, the dimensions and/or the shape of the lower periphery may vary depending on the manufacturing methods used to generate orifice layers of different thicknesses. The anisotropic etch of the silicon substrate provides a wall angle of approximately 54° from the plane of the substrate FIGS. 4A-4G illustrate a sequence of manufacturing various aspects of the foregoing embodiments. A silicon-wafer substrate 204 is provided in FIG. 4A. Each portion of the printhead that is to print greater drop-weight quantities of ink is then preferably etched in FIG. 4B. Again, the amount of etching will be related to the drop-weight quantity of ink printed from a respective firing chamber. As shown in FIG. 4C, a thin-film layer 300 that contains the resistors 208, 210 and conductive traces (not shown) is preferably applied.

Figure 4D:
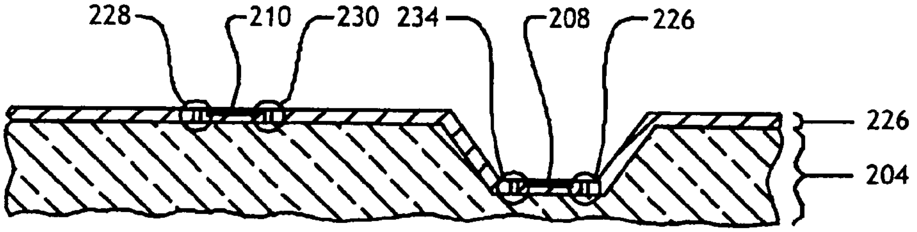

In FIG. 4D, an anisotropic process etches the conduits 224-230. Alternatively, the conduits may be laser drilled or formed by any other suitable means.

Figure 4E:
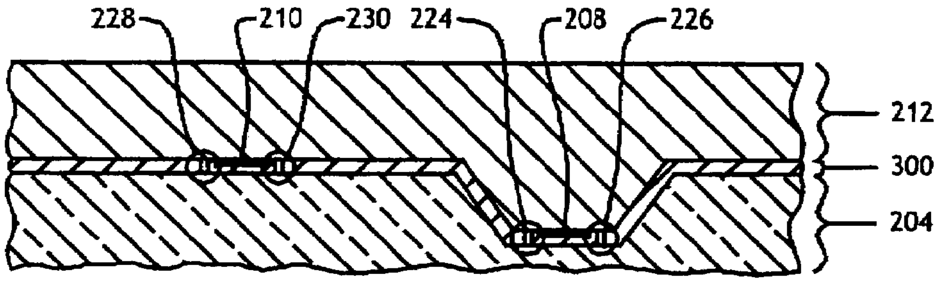

The orifice layer 212 is applied in FIG. 4E. The layer 212 may be laminated, screened, or "spun" on by pouring liquid material onto a spinning wafer to provide a material with a substantially planar exterior surface. The thickness of the orifice layer 212 will vary depending on whether the underlying substrate 204 was etched. Nonetheless, the orifice layer will conform to essentially the entire region near the firing chambers to prevent voids between chambers through which ink might leak. The orifice layer 212 may be selectively applied to portions of each printhead on the wafer, or may preferably be applied over the entire wafer surface to simplify processing.

Figure 4F:
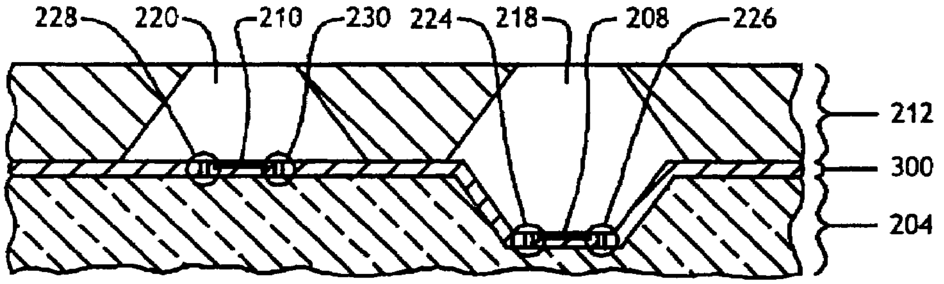

Preferably, the photo-defined process is used to form the firing chambers 218, 220 as shown in FIG. 4F. The best mode for performing this photo-defined process is by using a negative-acting photo-imagable epoxy. With a negative-acting, photo-imagable epoxy, material exposed to light will not be removed during a development process. Thus, a first photo-mask is applied in order to define the shape of the desired lower firing chamber. The material is then exposed to a full dosage of the amount of light required to expose the material. The first photo-mask is removed from the tool. A second photo-mask is then placed in the tool in order to define the orifice hole. The material is exposed a second time with less energy so that only the desired thickness of material (e.g. a half) is exposed. The wafer is then placed in a standard developing chemical. The developing chemical removes the unexposed portions of the wafer; however, the exposed portions are left in tact. Alternatively, other orifice-layer-forming processes may be used.

Figure 4G:
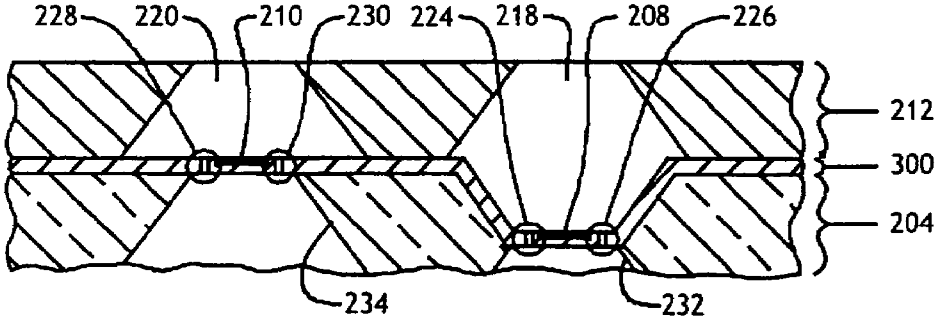

In FIG. 4G, the ink trenches 232, 234 are etched by anisotropic etching to form an angled profile. Prior to this, the lower surface of the wafer may be coated with a thin-film layer that is selectively applied with open regions. The etching of the trench would then proceed until the rear of the thin-film layer 300 is exposed, and the conduits 224-230 are in communication with their respective trenches 232, 234. Finally, the wafer is separated into individual printheads, which are attached to respective inkjet pens 100 as shown in FIG. 1 in communication with the ink supply.

Figure 5:
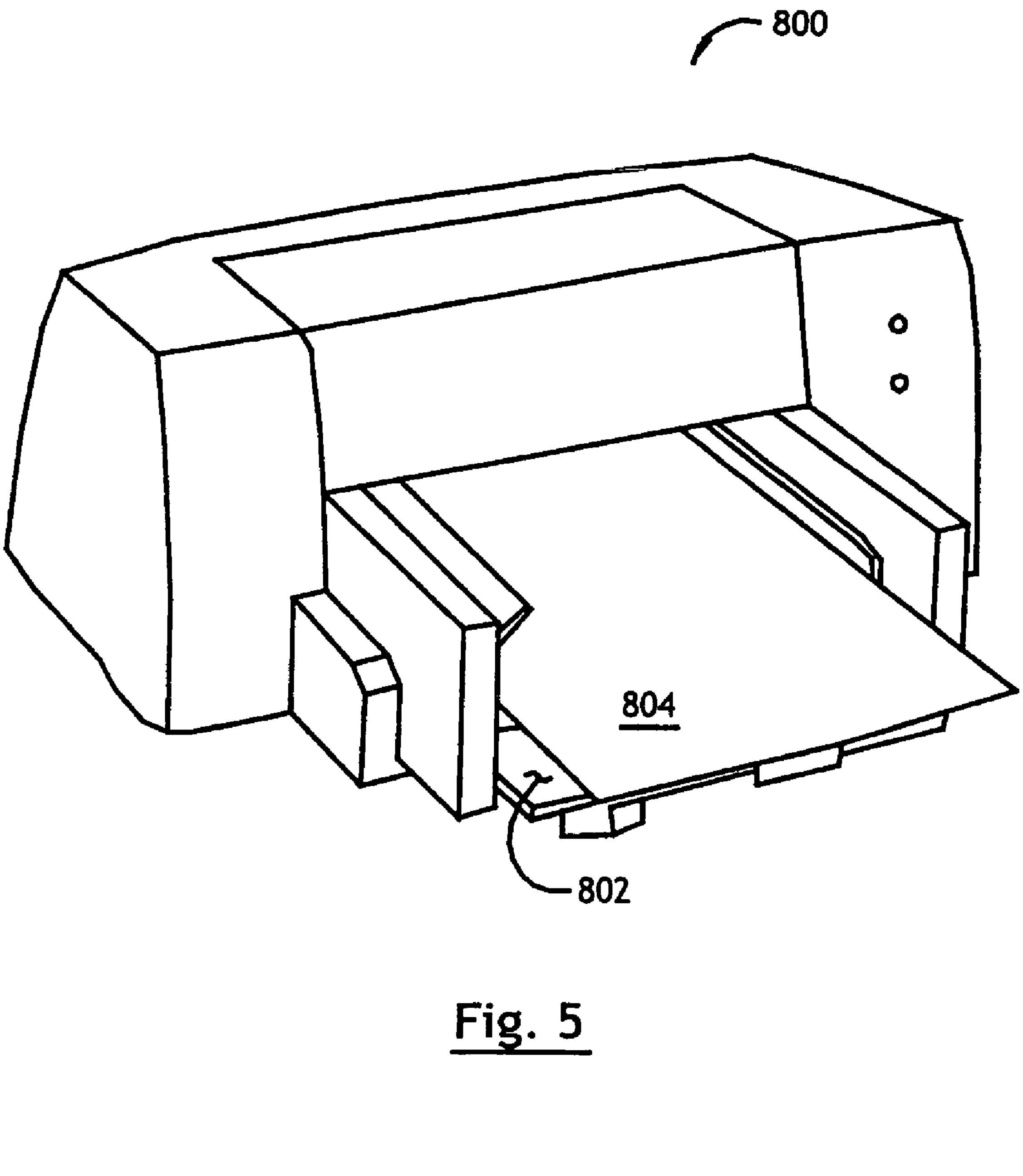
FIG. 5 is an isometric drawing of a typical printer that may employ an inkjet print cartridge utilizing the present invention.

FIG. 5 shows an isometric view of a typical inkjet printer 800 that may employ the present invention. An input tray 802 stores paper or other printable media 804.

Figure 6:
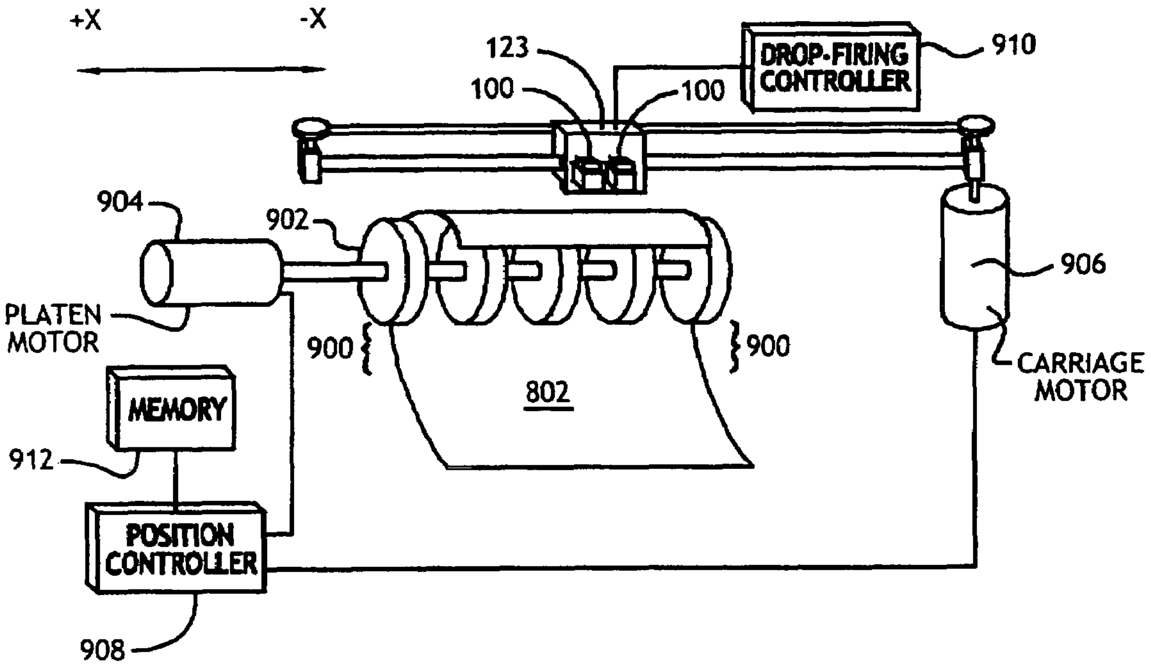
FIG. 6 is a schematic representation of a printer that may employ the present invention.

Referring to the schematic representation of a printer mechanism depicted in FIG. 6, a medium input 900 advances a single sheet of media 804 into a print area by using a roller 902, a platen motor 904, and traction devices (not shown). In a typical printer 800, one or more inkjet pens 100 are incrementally drawn across the medium 804 on the platen by a carriage motor 906 in a direction perpendicular to the direction of entry of the medium. The platen motor 904 and the carriage motor 906 are typically under the control of a media and cartridge position controller 908. An example of such positioning and control apparatus may be found described in U.S. Pat. No. 5,070,410 entitled "Apparatus and Method Using a Combined Read/Write Head for Processing and Storing Read Signals and for Providing Firing Signals to Thermally Actuated Ink Ejection Elements". Thus, the medium 804 is positioned in a location so that the pens 100 may eject droplets of ink to place dots on the medium as required by the data that is input to the printer's drop-firing controller 910.

These dots of ink are expelled from the selected orifices 106, 108 in a print-head element of selected pens in a band parallel to the scan direction as the pens 100 are translated across the medium by the carriage motor 906. When the pens 100 reach the end of their travel at an end of a print swath, the position controller 908 and the platen motor 904 typically advance the medium 804. Once the pens 100 have reached the end of their traverse in the X direction on a bar or other print cartridge support mechanism, they are either returned back along the support mechanism while continuing to print or returned without printing. The medium 804 may be advanced by an incremental amount equivalent to the width of the ink-ejecting portion of the printhead 102 or some fraction thereof related to the spacing between the nozzles 106, 108. The position controller 908 determines control of the medium 804, positioning of the pen(s) 100 and selection of the correct ink ejectors of the printhead for creation of an ink image or character. The controller 908 may be implemented in a conventional electronic hardware configuration and provided operating instructions from conventional memory 912. Once printing is complete, the printer 800 ejects the medium 804 into an output tray for user removal. Of course, inkjet pens 100 that employ the printhead 102 structures discussed above substantially enhance the printer's operation.

In sum, the present invention overcomes the limitations and problems of the prior art by providing different-sized firing chambers. In particular, by either etching the substrate or laterally offsetting ink-energizing elements from their corresponding orifices, the present invention provides larger and smaller volume firing chambers. This enables a manufacturer to provide inkjet printheads capable of printing varying drop-weight quantities of ink with optimum energy efficiency and dot shape, thereby allowing faster speed printing and less expensive manufacturing.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. For example, instead of being implemented in a FIT (i.e. fully integrated thermal inkjet printer), the present invention could be implemented in a TIJ (i.e. standard thermal inkjet printer). All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A method of manufacturing a printhead capable of printing smaller and larger drop-weight quantities of ink, the method comprising the steps of:

providing a substrate;

etching the substrate in order to define at least two substrate areas with different substrate thicknesses;

applying a thin-film layer that contains at least one ink-energizing element in each of the substrate areas;

etching a plurality of ink-supplying conduits in the thin-film layer;

etching at least one ink-supplying trench in the substrate, said ink-supplying trench in fluid communication with at least some of the ink-supplying conduits;

applying an orifice layer to the substrate, the orifice layer having an exterior-orifice-layer surface that is substantially planar such that there are at least two orifice areas with different orifice thicknesses that correspond to said two substrate areas with different substrate thicknesses, the at least two orifice areas being formed with different volumes to contain different drop-weight quantities of ink; and forming at least one firing chamber in each of said at least two orifice areas.

2. The method of claim 1 wherein said at least one ink-energizing element in the thin-film layer includes a first ink-energizing element and a second ink-energizing element, the first ink-energizing element being less powerful than the second ink-energizing element.

3. The method of claim 1 wherein the ink-energizing elements are resistors.

4. The method of claim 1 wherein the substrate is etched to form a non-planar surface according to the different substrate thicknesses; and where the thin-film layer is formed with a non-planar surface to align with the non-planar surface of the substrate.

5. The method of claim 1 wherein said at least one firing chamber is formed to include first and second firing chambers having different volumes.

6. The method of claim 1 wherein the substrate, the first firing chamber, and the second firing chamber are formed by an anisotropic process that provides approximately 54° sidewalls in the substrate, the first firing chamber, and the second firing chamber.

7. The method of claim 1 wherein the ink-supply conduits are created by anisotropic etching.

8. The method of claim 1 wherein the ink-supply conduits are created by laser drilling.

9. A method of manufacturing a printhead capable of printing smaller and larger drop-weight quantities of ink, the method comprising:

providing a substrate;

etching the substrate in order to define at least two substrate areas with different substrate thicknesses;

applying a thin-film layer that contains at least one ink-energizing element aligned with one of the substrate areas;

etching a plurality of ink-supplying conduits in the thin-film layer;

etching at least one ink-supplying trench in the substrate, said ink-supplying trench in fluid communication with at least some of the ink-supplying conduits;

applying an orifice layer to the substrate, the orifice layer having an exterior-orifice-layer surface that is substantially planar such that there are at least two orifice areas with different orifice thicknesses that correspond to said two substrate areas with different substrate thicknesses; and forming a first firing chamber in a first area of said at least two orifice areas and a second firing chamber in a second area of said at least two orifice areas.

10. A method of manufacturing a printhead capable of printing smaller and larger drop-weight quantities of ink, the method comprising:

providing a substrate;

etching the substrate in order to define at least two substrate areas with different substrate thicknesses;

applying a thin-film layer that contains at least one ink-energizing element aligned with one of the substrate areas;

etching a plurality of ink-supplying conduits in the thin-film layer;

etching at least one ink-supplying trench in the substrate, said ink-supplying trench in fluid communication with at least some of the ink-supplying conduits;

applying an orifice layer to the substrate, the orifice layer having an exterior-orifice-layer surface that is substantially planar such that there are at least two orifice areas with different orifice thicknesses that correspond to said two substrate areas with different substrate thicknesses; and forming a first firing chamber in a first area of said at least two orifice areas and a second firing chamber in a second area of said at least two orifice areas;

wherein the a first firing chamber is formed having a first volume; and wherein the second firing chamber is formed having a second volume that is greater than the first volume.

* * * * *

UNITED STATES PATENT AND TRADEMARK OFFICE

CERTIFICATE OF CORRECTION

PATENT NO. : 7,478,476 B2
APPLICATION NO. : 11/226131
DATED : January 20, 2009
INVENTOR(S) : Naoto Kawamura It is certified that error appears in the above-identified patent and that said Letters Patent is hereby corrected as shown below:

On the title page, item (54), in column 1, in “Title”, line 2, delete “WIGHTS” and insert -- WEIGHTS --, therefor.

In column 1, line 2, delete “WIGHTS” and insert -- WEIGHTS --, therefor.

In column 8, line 61, in Claim 10, after “the” delete “a”.

Signed and Sealed this

Thirtieth Day of June, 2009

JOHN DOLL
*Acting Director of the United States Patent and Trademark Office*